(12) United States Patent
Nakano (10) Patent No.: US 9,447,721 B2
(45) Date of Patent: Sep. 20, 2016

(54) FUEL INJECTION CONTROL DEVICE FOR INTERNAL COMBUSTION ENGINE

(75) Inventor: Tomohiro Nakano, Nagoya (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 224 days.

(21) Appl. No.: 14/353,339

(22) PCT Filed: Oct. 26, 2011

(86) PCT No.: PCT/JP2011/074699
§ 371 (c)(1),
(2), (4) Date: Apr. 22, 2014

(87) PCT Pub. No.: WO2013/061424
PCT Pub. Date: May 2, 2013

(65) Prior Publication Data
US 2014/0261302 A1    Sep. 18, 2014

(51) Int. Cl.
*F02B 17/00* (2006.01)
*F02D 41/34* (2006.01)
*F02D 41/30* (2006.01)
*F02P 5/04* (2006.01)
*F02D 41/40* (2006.01)
F02D 37/02 (2006.01)
F02P 5/152 (2006.01)

(52) U.S. Cl.
CPC ......... *F02B 17/005* (2013.01); *F02D 41/3094* (2013.01); *F02D 41/34* (2013.01); *F02D 41/402* (2013.01); *F02P 5/045* (2013.01); F02P 5/152 (2013.01); F02D 37/02 (2013.01); Y02T 10/44 (2013.01)

(58) Field of Classification Search
CPC ............... F02B 17/005; F02D 41/402; F02D 41/3094; F02D 41/34; F02D 37/02; F02D 41/401; F02P 5/045; F02P 5/152; Y02T 10/44

USPC .......... 123/299, 295, 300, 305; 701/102–105
See application file for complete search history.

(56) References Cited

U.S. PATENT DOCUMENTS

| | | | | |
|---|---|---|---|---|
| 6,085,718 A * | 7/2000 | Nishimura | .......... | F02D 35/0092 123/295 |
| 6,116,208 A * | 9/2000 | Nishimura | ............ | F01N 3/0842 123/295 |
| 6,257,197 B1 * | 7/2001 | Nishimura | .............. | F02D 33/00 123/295 |

(Continued)

FOREIGN PATENT DOCUMENTS

| | | |
|---|---|---|
| CN | 101495740 A | 7/2009 |
| JP | 2000045840 A | 2/2000 |

(Continued)

*Primary Examiner* — Joseph Dallo
(74) *Attorney, Agent, or Firm* — Kenyon & Kenyon LLP (57) ABSTRACT

When injecting fuel from a direct injector and a port injector such that a requested fuel injection amount is obtained in an internal combustion engine, the direct injector is driven in the following manner. That is, after a target fuel injection amount for the fuel injection with the higher priority among fuel injection in the late stage of an intake stroke and fuel injection in the early stage of the intake stroke in the direct injector has been set on the basis of the engine operating condition, the target fuel injection amount for the fuel injection with the lower priority is set on the basis of the engine operating condition. Moreover, the direction injector is driven in such a manner that the target fuel injection amount for each of the abovementioned fuel injections set in this manner is obtained.

3 Claims, 8 Drawing Sheets

(56) References Cited

U.S. PATENT DOCUMENTS

| | | | |
|---|---|---|---|
| 6,513,320 B1* | 2/2003 | Nishimura | F01N 3/0842 123/299 |
| 7,287,509 B1* | 10/2007 | Brehob | F02D 41/0025 123/1 A |
| 7,894,973 B2* | 2/2011 | Mallebrein | F02D 35/025 123/431 |
| 2002/0029768 A1* | 3/2002 | Matsubara | F02D 41/0045 123/500 |
| 2008/0178836 A1* | 7/2008 | Yamashita | F02B 17/00 123/295 |
| 2009/0194069 A1 | 8/2009 | Ashizawa | |
| 2009/0281709 A1* | 11/2009 | Mallebrein | F02D 35/025 701/104 |
| 2009/0320796 A1* | 12/2009 | Kojima | F02M 55/04 123/447 |
| 2011/0184629 A1* | 7/2011 | Krengel | F02D 19/061 701/103 |

FOREIGN PATENT DOCUMENTS

| | | |
|---|---|---|
| JP | 2001-098971 A | 4/2001 |
| JP | 2003-193894 A | 7/2003 |
| JP | 2004-003429 A | 1/2004 |
| JP | 2005-194965 A | 7/2005 |
| JP | 2006-194098 A | 7/2006 |
| JP | 2007-177731 A | 7/2007 |
| JP | 2009-013818 A | 1/2009 |
| JP | 2009-191663 A | 8/2009 |

* cited by examiner

FUEL INJECTION CONTROL DEVICE FOR INTERNAL COMBUSTION ENGINE

CROSS-REFERENCE TO RELATED APPLICATIONS

This is a national phase application based on the PCT International Patent Application No. PCT/JP2011/074699 filed on Oct. 26, 2011, the entire contents of which are incorporated herein by reference.

TECHNICAL FIELD

The present invention relates to a fuel injection control device for an internal combustion engine.

BACKGROUND ART

As an internal combustion engine for a vehicle including an automobile, a type having a direct injector for injecting fuel into a cylinder and a port injector for injecting fuel into an intake port is known. In such an internal combustion engine, fuel is injected by at least one of the direct injector and the port injector such that a requested fuel injection amount determined based on the engine operating state is achieved. If the direct injector is activated at this time, the direct injector injects an amount of fuel that corresponds to at least some of the requested fuel injection amount is injected by the activation.

Patent Document 1 discloses an internal combustion engine having a direct injector and a port injector. In the disclosed configuration, if the fuel injection amount exceeds the upper limit of a range in which smoke is suppressed when the direct injector injects fuel, the amount of fuel corresponding to the excess over the upper limit is injected by the port injector. Patent Document 2 discloses that, when fuel is injected by a direct injector, the fuel injection is carried out in a divided manner in a shot corresponding to the early stage of the intake stroke and a shot corresponding to the late stage of the intake stroke. In these cases, the amount of fuel to be injected from the direct injector is divided into target fuel injection amounts for respective fuel injection shots in correspondence with a predetermined ratio. The direct injector is then activated such that the respective target fuel injection amounts are achieved.

Specifically, the fuel injection in the late stage of the intake stroke and the fuel injection in the early stage of the intake stroke bring about desirable engine operation, as will be described in the items [1] and [2] below. [1] The fuel injection in the late stage of the intake stroke intensifies the air streams in the cylinder through injected fuel to achieve desirable fuel combustion, when the piston movement speed decreases and thus reduces air stream generation in the cylinder. [2] The fuel injection in the early stage of the intake stroke allows the injected fuel to adhere directly to the piston top and thus cools the piston top using latent heat of vaporization produced by the fuel and suppresses the occurrence of knocking in the engine.

PRIOR ART DOCUMENTS

Patent Documents

Patent Document 1: Japanese Laid-Open Patent Publication No. 2005-194965 (paragraph [0015]

Patent Document 2: Japanese Laid-Open Patent Publication No. 2006-194098 (paragraphs [0080] to [0086]

SUMMARY OF THE INVENTION

Problems that the Invention is to Solve

To achieve desirable engine operation in an internal combustion engine having a direct injector, it is preferable to perform the fuel injection from the direct injector in the shot corresponding to the late stage of the intake stroke and the shot corresponding to the early stage of the intake stroke to bring about the above-described advantages [1] and [2] to a maximum extent. For this purpose, the fuel injection amounts (the target fuel injection amounts) in the respective shots of fuel injection must be adjusted to requested values necessary for achieving the advantages [1] and [2] in the current engine operating state.

However, when the fuel injection in the shots corresponding to the late stage of the intake stroke and the early stage of the intake stroke are carried out by dividing the fuel injection from the direct injector into multiple shots in the manner described in Patent Document 2, it is difficult to set the target fuel injection amounts in the respective fuel injection shots to the values (the requested values) necessary for obtaining the corresponding advantages [1] and [2].

Specifically, the target fuel injection amounts in the respective fuel injection shots are set by dividing the target fuel injection amount for the full amount of the fuel injected from the direct injector by a predetermined ratio. Accordingly, in this case, to obtain desired one of the advantages [1] and [2], the ratio must be set such that the target fuel injection amount in the fuel injection shot associated with the desired advantage [1] and [2] becomes the value (the requested value) necessary for achieving the desired advantage. However, if the target fuel injection amount in the other fuel injection shot is determined using the thus set ratio, the fuel injection in the other shot, which is performed to achieve the target fuel injection amount, may not be capable of achieving the associated advantages [1] or [2], which is the advantage different from the desired advantage. Specifically, the target fuel injection amounts in the respective fuel injection shots necessary for achieving the associated advantages [1] and [2] vary in mutually different manners in correspondence with the engine operating state. Accordingly, when the target fuel injection amounts in the fuel injection shots are set in the above-described manner, it is highly likely that one of the target fuel injection amounts cannot achieve the associated advantage, which is the advantage different from the desired one. In other words, the advantage other than the desired advantage cannot necessarily be obtained.

Accordingly, if the target fuel injection amounts in the respective fuel injection shots are set by dividing the target fuel injection amount for the full amount of the fuel injected from the direct injector by the above-described ratio, it is difficult to set the target fuel injection amounts to the values (the requested values) necessary for obtaining the corresponding advantages [1] and [2]. This makes it difficult to obtain the advantages [1] and [2] altogether, thus hampering maximum-performance operation of the internal combustion engine.

Accordingly, it is an objective of the present invention to provide a fuel injection control device for an internal combustion engine capable of achieving maximum engine performance by adjusting the amount of fuel injected from a direct injector to an adequate value.

Means for Solving the Problems

To achieve the foregoing objective and in accordance with one aspect of the present invention, a fuel injection control device for an internal combustion engine is provided that has a direct injector capable of injecting fuel into a cylinder of the engine in a late stage of an intake stroke and an early stage of the intake stroke of the engine. The fuel injection control device performs fuel injection from the direct injector to supply at least some of a requested fuel injection amount determined based on an engine operating state. The control device sets a target fuel injection amount of the fuel injection from the direct injector in the late stage of the intake stroke to a requested value corresponding to the engine operating state. The control device performs fuel injection from the direct injector in the late stage of the intake stroke by the target fuel injection amount, and operates the direct injector to inject, in the early stage of the intake stroke, an amount of fuel that corresponds to a part of the requested fuel injection amount that cannot be injected by the fuel injection from the direct injector in the late stage of the intake stroke.

Between the fuel injection from the direct injector in the shot of the late stage of the intake stroke and the shot of the early stage of the intake stroke, the fuel injection in a shot closer to the ignition timing is given higher priority. Specifically, the fuel injection in the shot closer to the ignition timing has greater influence on fuel ignition caused by variation in the fuel injection amount and is thus given the higher priority. For the same reason, the fuel injection in the shot of the early stage of the intake stroke, which is less close to the ignition timing, is given the lowest priority.

As a result, as has been described, the target fuel injection amount of the fuel injection from the direct injector in the late stage of the intake stroke is set to the requested value corresponding to the engine operating state with high priority over the target fuel injection amount of the fuel injection from the direct injector in the early stage of the intake stroke. The target fuel injection amount of the fuel injection from the direct injector in the shot having the high priority, which is the shot in the late stage of the intake stroke, is thus set, based on the engine operating state, to the value (the requested value) that maximizes the advantages of the fuel injection in the shot. Fuel injection from the direct injector is performed through a shot of the target fuel injection amount in the late stage of the intake stroke. Further, the direct injector injects, through another shot, an amount of fuel that corresponds to a part of the requested fuel injection amount that cannot be injected by the fuel injection in the late stage of the intake stroke. As a result, the advantages of the fuel injection in both shots are ensured to a maximum extent. This achieves the advantages of the fuel injection in all shots of the fuel injection to a maximum extent to obtain maximum engine performance.

The fuel injection from the direct injector in the shot with a higher priority than the shot in the early stage of the intake stroke, which is the shot in the late stage of the intake stroke, has the characteristics described below. That is, the fuel injection in the late stage of the intake stroke promotes formation of air-fuel mixture by intensifying air streams in the cylinder but may adversely affect the fuel combustion if the fuel injection amount increases beyond the corresponding target fuel injection amount.

Accordingly, as has been described, an amount of fuel that corresponds to a part of the requested fuel injection amount that cannot be injected by the fuel injection in the late stage of the intake stroke is injected by the fuel injection in the early stage of the intake stroke, which is given lower priority than the fuel injection in the late stage of the intake stroke. This makes it unlikely that the fuel injection amount of the fuel injection in the late stage of the intake stroke will increase beyond the target fuel injection amount to supply the requested fuel injection amount and thus adversely affect the fuel combustion. Also, since the fuel injection amount of the fuel injection in the late stage of the intake stroke becomes equal to the target fuel injection amount, the air streams in the cylinder are intensified through such fuel injection.

Another form of the present invention includes a direct injector capable of injecting fuel into a cylinder of an internal combustion engine in the late stage of an intake stroke and the early stage of the intake stroke of the engine and a port injector capable of injecting fuel into an intake port of the engine. The direct injector and the port injector are operated in the manner described below, when fuel is injected from the direct injector and the port injector to supply a requested fuel injection amount, which is determined based on the engine operating state.

That is, of the target fuel injection amounts of fuel injection from the direct injector in the late stage of an intake stroke and the early stage of the intake stroke, the target fuel injection amount of the fuel injection with a higher priority is set as a requested value corresponding to the engine operating state. Then, the target fuel injection amount of the fuel injection with the lower priority is set as a requested value corresponding to the engine operating state. The direct injector is then actuated (to perform the fuel injection) in the early stage of the intake stroke and the late stage of the intake stroke based on the corresponding target fuel injection amounts to achieve the target fuel injection amounts of the respective fuel injection shots.

In this case, the target fuel injection amounts of the fuel injection from the direct injector in the above-described shots are set based on the engine operating state to the values (the requested values) that maximize the advantages of the fuel injection in the respective shots, sequentially in the descending order according to the priority ranks given to the shots in the current engine operating state. The direct injector is then operated to achieve the target fuel injection amounts of the respective shots of fuel injection. This achieves the advantages of the fuel injection in all shots of the fuel injection to a maximum extent to obtain maximum engine performance.

However, there may be a case in which the sum of the target fuel injection amounts of the fuel injection from the direct injector in the late stage of the intake stroke and the early stage of the intake stroke falls short of the requested fuel injection amount. In this case, the fuel of the requested fuel injection amount cannot be fully injected by the fuel injection from the direct injector in the late stage of the intake stroke and the early stage of the intake stroke. To solve this problem, an amount of fuel that corresponds to a part of the requested fuel injection amount that cannot be injected by the fuel injection from the direct injector in the above-described shots is set as the target fuel injection amount of the fuel injection from the port injector. The port injector is thus operated based on the set target fuel injection amount to achieve the target fuel injection amount.

The fuel injection from the direct injector in the late stage of the intake stroke promotes formation of air-fuel mixture by intensifying air streams in the cylinder but may adversely affect the fuel combustion if the fuel injection amount increases beyond the corresponding target fuel injection amount. The fuel injection from the direct injector in the early stage of the intake stroke cools the piston top using latent heat of vaporization produced by injected fuel to cool the temperature in the cylinder and suppress the occurrence of knocking. However, such fuel injection may adversely affect the fuel combustion if the fuel injection amount increases beyond the corresponding target fuel injection amount.

To avoid these problems, an amount of fuel that corresponds to a part of the requested fuel injection amount that cannot be injected by the fuel injection from the direct injector in the late stage of the intake stroke and the early stage of the intake stroke is injected by the fuel injection from the port injector. This makes it unlikely that the fuel injection amount of the fuel injection in the late stage of the intake stroke or the early stage of the intake stroke will increase beyond the corresponding target fuel injection amount to supply the requested fuel injection amount and thus adversely affect the fuel combustion. Also, since the fuel injection amount of the fuel injection in the late stage of the intake stroke becomes equal to the target fuel injection amount, the air streams in the cylinder are intensified through such fuel injection. Additionally, since the fuel injection amount of the fuel injection in the early stage of the intake stroke becomes equal to the corresponding target fuel injection amount, the piston top is cooled appropriately through such fuel injection, and the occurrence of knocking is suppressed through such cooling.

Another form of the present invention operates a direct injector, which is capable of injecting fuel into a cylinder of an internal combustion engine to supply at least some of a requested fuel injection amount determined based on the engine operating state, in the manner described below to inject fuel from the direct injector. That is, of the target fuel injection amounts of fuel injection from the direct injector in the late stage of an intake stroke and the early stage of the intake stroke, the target fuel injection amount of the fuel injection with a higher priority is set as a requested value corresponding to the engine operating state. Then, the target fuel injection amount of the fuel injection with the lower priority is set as a requested value corresponding to the engine operating state. The direct injector is then operated based on the target fuel injection amounts of the respective shots of the fuel injection to achieve the target fuel injection amounts.

In this case, the target fuel injection amounts of the fuel injection from the direct injector in the above-described shots are set based on the engine operating state to the values (the requested values) that maximize the advantages of the fuel injection in the respective shots, sequentially in the descending order according to the priority ranks given to the shots in the current engine operating state. The direct injector is then operated to achieve the target fuel injection amounts of the respective shots of fuel injection. This achieves the advantages of the fuel injection in all shots of the fuel injection to a maximum extent to obtain maximum engine performance.

Another form of the invention sets the target fuel injection amount of the fuel injection from the direct injector in the early stage of the stroke to a greater value as the engine load becomes greater. Specifically, the fuel injection in the early stage of the intake stroke cools the piston top using latent heat of vaporization produced by injected fuel and thus suppresses the occurrence of knocking in the engine through such cooling. The internal combustion engine has such an ignition timing that maximizes output torque (MBT). It is thus desirable that the ignition timing be advanced to the MBT without causing knocking. However, the temperature in the cylinder becomes higher and may induce knocking as the engine load becomes greater. The ignition timing of the engine thus must be retarded with respect to the MBT not to cause an excessive rise of the temperature in the cylinder. Such retardation of the ignition timing hampers increase in the output torque of the engine. However, by setting the target fuel injection amount in the early stage of the intake stroke to a greater value as the engine load becomes greater, as has been described, such fuel injection cools the piston top more effectively as the engine load becomes greater. A temperature rise in the cylinder thus becomes unlikely to occur and the knocking also becomes unlikely to happen. This allows advancement of the ignition timing of the engine toward the MBT, thus increasing the output torque of the engine through such ignition timing advancement.

BRIEF DESCRIPTION OF THE DRAWINGS

FIG. 10($a$) is a graph representing the manners in which final ignition timings E, I, and MBT change in relation to change of the engine load;

FIG. 10($b$) is a graph representing change of the manner in which the engine 1 performs fuel injection.

MODES FOR CARRYING OUT THE INVENTION

One embodiment of a fuel injection control device for an internal combustion engine mounted in a vehicle according to the present invention will now be described with reference to FIGS. 1 to 11.

Figure 1:
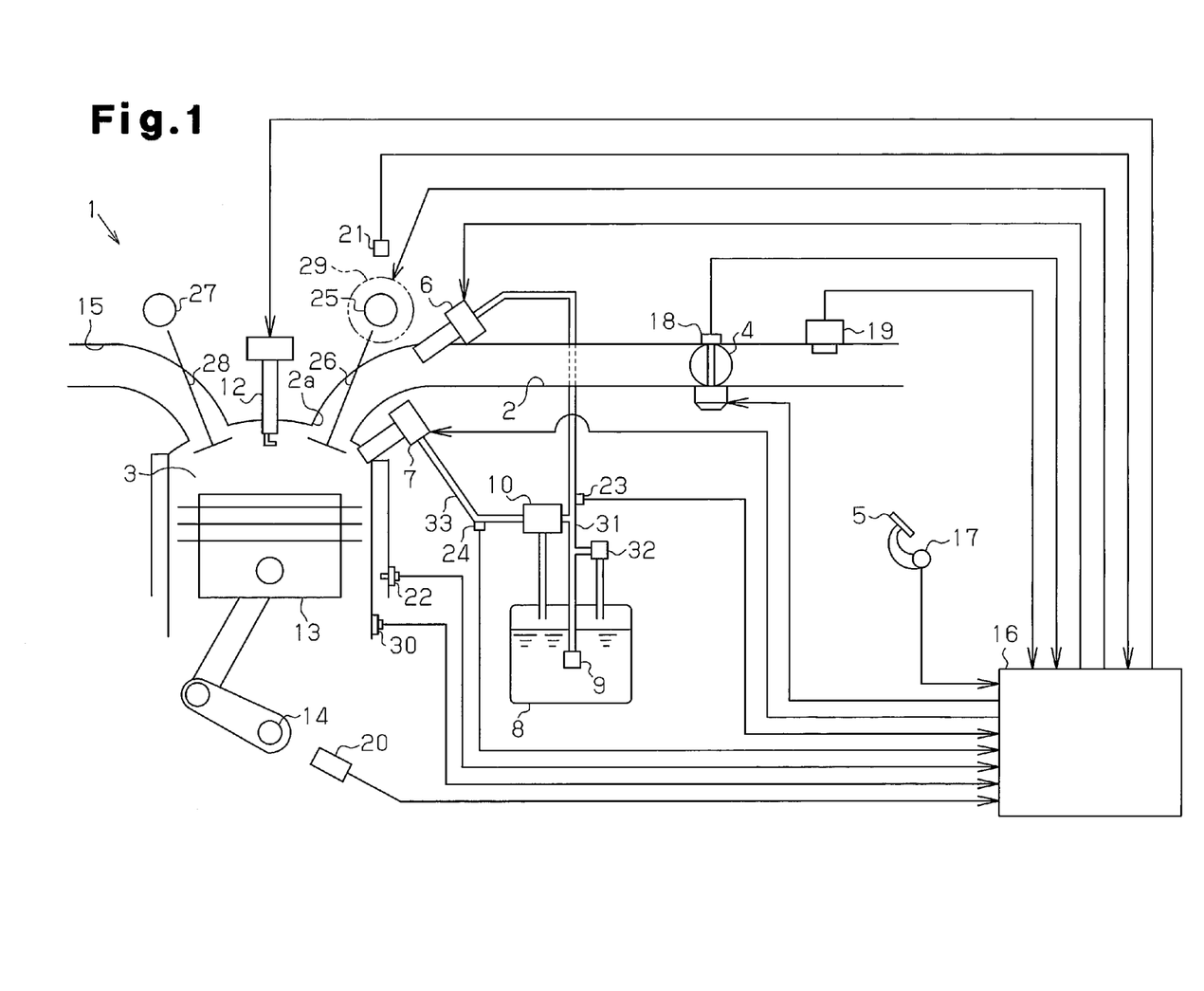
FIG. 1 is a diagram schematically showing an internal combustion engine as a whole employing a fuel injection control device according to one embodiment of the present invention.

As shown in FIG. 1, a throttle valve 4 is arranged in an intake passage 2 of an internal combustion engine 1 and selectively opens and closes to adjust the amount of air drawn into a combustion chamber 3 (the intake air amount). The opening degree of the throttle valve 4 (the throttle opening degree) is adjusted in correspondence with the operating amount of an accelerator pedal 5 (the accelerator operating amount), which is depressed by the driver of the vehicle. The engine 1 has a port injector 6, which injects fuel from the intake passage 2 into an intake port 2a of the combustion chamber 3, and a direct injector 7, which injects fuel into the combustion chamber 3 (into a cylinder). The fuel is supplied to the injectors 6, 7 from a fuel tank 8.

Specifically, the fuel in the fuel tank 8 is drawn by a feed pump 9 and then delivered to the port injector 6 via a low-pressure fuel pipe 31. The fuel pressure in the low-pressure fuel pipe 31 is adjusted to the feed pressure through operation control performed on the feed pump 9 and prevented from excessively increasing by a pressure regulator 32, which is formed in the low-pressure fuel pipe 31. Some of the fuel in the low-pressure fuel pipe 31, which has been drawn by the feed pump 9, is pressurized by a high-pressure fuel pump 10 to a value higher than the feed pressure (hereinafter, referred to as the direct injection pressure) and then supplied to the direct injector 7 via a high-pressure fuel pipe 33.

In the engine 1, air-fuel mixture is formed by the fuel injected from the injectors 6, 7 and the air flowing in the intake passage 2 and received in the combustion chamber 3. The air-fuel mixture is then ignited by a spark plug 12. The air-fuel mixture thus burns and produces combustion energy, which reciprocates a piston 13 to rotate a crankshaft 14. The burned air-fuel mixture is discharged to an exhaust passage 15 as exhaust gas. An intake valve 26 selectively opens and closes through rotation of an intake camshaft 25, to which rotation of the crankshaft 14 is transmitted, to permit or block communication between the combustion chamber 3 and the intake passage 2. An exhaust valve 28 selectively opens and closes through rotation of an exhaust camshaft 27, to which rotation of the crankshaft 14 is transmitted, to permit or block communication between the combustion chamber 3 and the exhaust passage 15.

The engine 1 has a variable valve timing mechanism 29 as a variable valve actuation mechanism for varying the characteristics of opening and closing of the intake valve 26. The variable valve timing mechanism 29 changes the rotation phase of the intake camshaft 25 relative to the rotation phase of the crankshaft 14 (the valve timing of the intake valve 26). The variable valve timing mechanism 29 is actuated to advance or retard both the opening timing and the closing timing of the intake valve 26 with the opening period (the actuation angle) of the intake valve 26 maintained constant.

The electric configuration of the fuel injection control device of the first embodiment will hereafter be described.

The fuel injection control device includes an electronic control unit 16, which carries out various types of operation control of the engine 1. The electronic control unit 16 has a CPU for executing various calculation procedures related to the operation control, a ROM for storing programs and data necessary for the control, a RAM for temporarily memorizing calculation results from the CPU, and input and output ports for inputting and outputting signals from and to the exterior.

Various sensors including the sensors described below are connected to the input port of the electronic control unit 16.

An accelerator position sensor 17 detects the accelerator operation amount.

A throttle position sensor 18 detects the throttle opening degree.

An air flow meter 19 detects the amount of the air passing through the intake passage 2 (the intake air amount of the engine 1).

A crank position sensor 20 outputs signals corresponding to rotation of the crankshaft 14.

A cam position sensor 21 outputs signals corresponding to the rotational position of the intake camshaft 25 based on rotation of the intake camshaft 25.

A coolant temperature sensor 22 detects the temperature of the coolant in the engine 1.

A first pressure sensor 23 detects the fuel pressure in the low-pressure fuel pipe 31 (the feed pressure).

A second pressure sensor 24 detects the fuel pressure in the high-pressure fuel pipe 33 (the direct injection pressure).

A knock sensor 30 detects knocking in the engine 1.

Drive circuits for various devices, including the throttle valve 4, the port injector 6, the direct injector 7, the spark plug 12, and the variable valve timing mechanism 29, are connected to the output port of the electronic control unit 16.

Based on signals received from the above-described sensors, the electronic control unit 16 determines the engine operating state including the engine speed and the engine load. The electronic control unit 16 then provides command signals to drive circuits for various devices, including the throttle valve 4, the injectors 6, 7, the feed pump 9, the spark plug 12, and the variable valve timing mechanism 29, based on the engine operating state. In this manner, the various types of operation control of the engine 1, such as throttle opening degree control, fuel injection control, and ignition timing control for the engine 1 and valve timing control for the intake valve 26, are carried out through the electronic control unit 16. When performing the fuel injection control, the electronic control unit 16 functions as a drive section for driving the port injector 6 and the direct injector 7.

Specifically, the aforementioned engine speed is determined using a detection signal from the crank position sensor 20. The engine load is calculated using a parameter corresponding to the intake air amount of the engine 1 and the engine speed. The parameter corresponding to the intake air amount may be an actual measurement of the intake air amount of the engine 1 determined using a detection signal from the air flow meter 19, the throttle opening degree obtained from a detection signal from the throttle position sensor 18, or the accelerator operation amount determined using a detection signal from the accelerator position sensor 17.

Fuel injection amount control is performed as part of the fuel injection control of the engine 1 by determining a requested fuel injection amount Qfin for the engine 1 as a whole based on the engine operating state including the engine speed and the engine load and then operating the port injector 6 and the direct injector 7 to inject fuel such that the requested fuel injection amount Qfin is achieved. Specifically, in this control, the direct injector 7 is actuated to ensure fuel injection of at least some of the amount corresponding to requested fuel injection amount Qfin.

Figure 2:
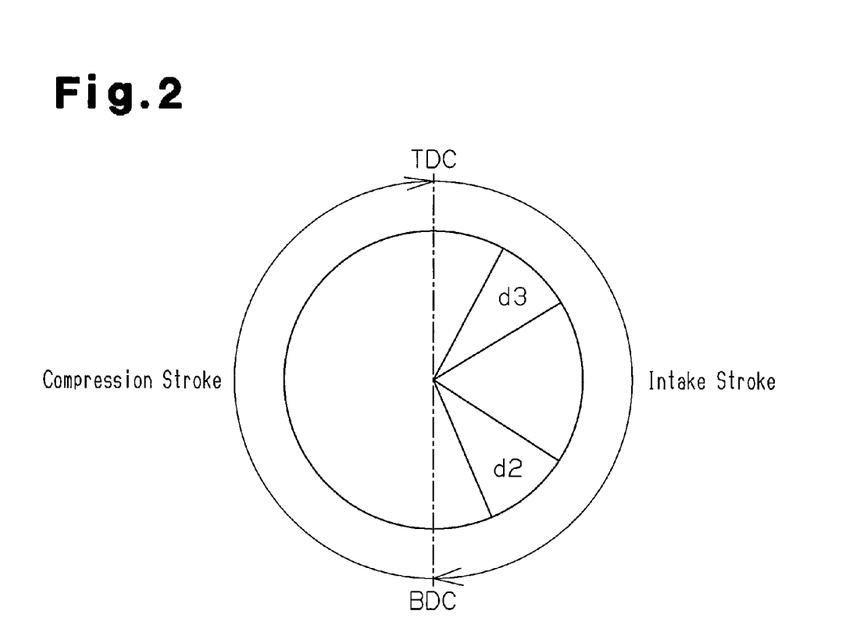
FIG. 2 is an explanatory diagram illustrating a mode of fuel injection from a direct injector.

The fuel injection from the direct injector 7 may include shots of fuel injection in the late stage of the intake stroke and the early stage of the intake stroke of the engine 1. FIG. 2 illustrates fuel injection periods corresponding to the fuel injection shots by way of example. A late-stage fuel injection period d2 represents the fuel injection shot in the late stage of the intake stroke, and an early-stage fuel injection period d3 represents the fuel injection shot in the early stage of the intake stroke. Since predetermined time intervals need to be set between the late-stage fuel injection period d2 and the early-stage fuel injection period d3, maximum values for the respective fuel injection periods d2, d3 are determined based on the predetermined time interval. As has been described in the BACKGROUND ART section, the fuel injection shots of the direct injector 7 in the late stage of the intake stroke and the early stage of the intake stroke bring about desired engine operation described in the items [1] and [2], respectively, as will be described below.

Figure 3:
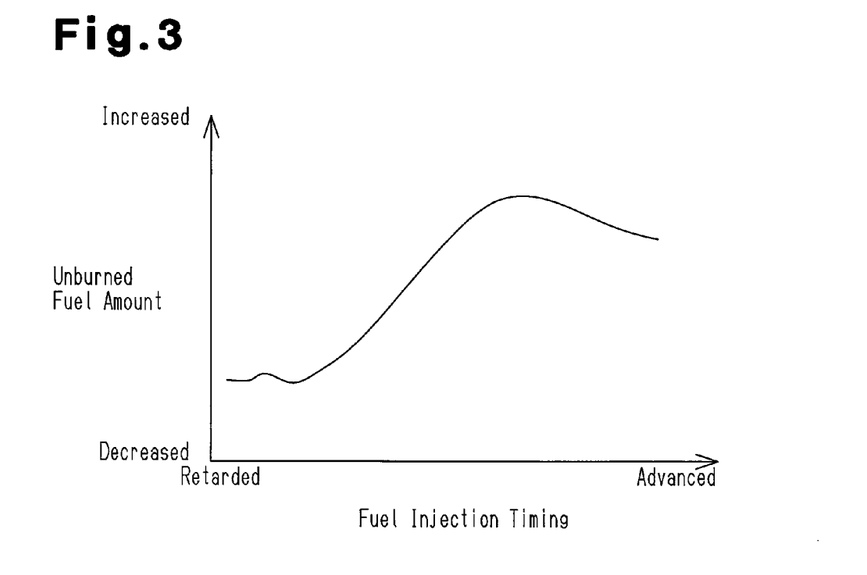
FIG. 3 is a graph representing the change of the unburned fuel amount in the cylinder in relation to the change of the fuel injection timing of the direct injector in the intake stroke.

[1] The fuel injection in the late stage of the intake stroke is advantageous in that, when the movement speed of the piston 13 decreases and thus reduces air stream generation in the cylinder caused by movement of the piston 13, the fuel injection in the late stage of the intake stroke intensifies the air streams in the cylinder to achieve desired fuel combustion. FIG. 3 represents change of the unburned fuel amount in the cylinder in relation to change of the fuel injection timing of the direct injector 7 in the intake stroke. As is clear from the graph, the air streams in the cylinder intensified through the fuel injection in the late stage of the intake stroke promote formation of air-fuel mixture in the cylinder to achieve desired fuel combustion, thus decreasing the unburned fuel amount in the cylinder.

Figure 4:
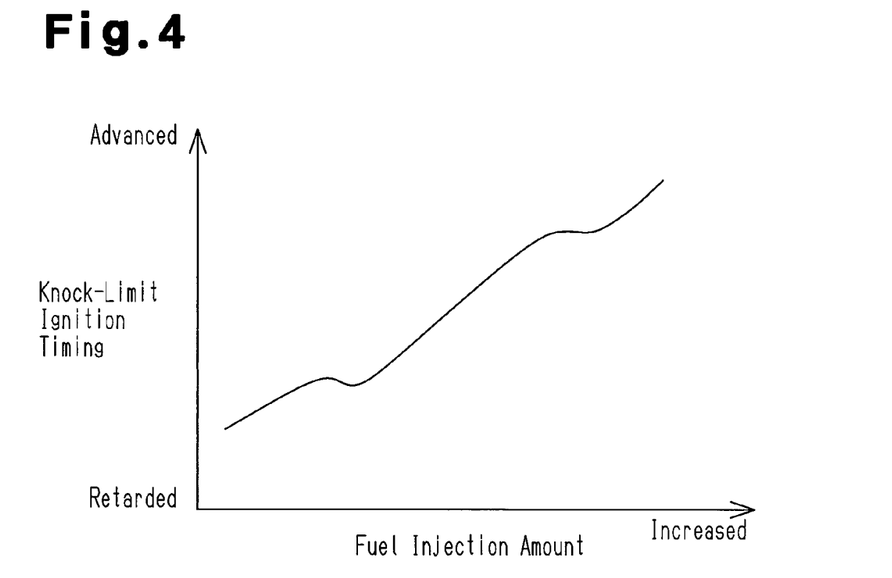
FIG. 4 is a graph representing the relationship between the fuel injection amount of the fuel injection from the direct injector in the early stage of the intake stroke and the ignition timing (the knock limit ignition timing) of the engine at the time when the ignition timing is advanced to such a limit that knocking does not occur.
Figure 5:
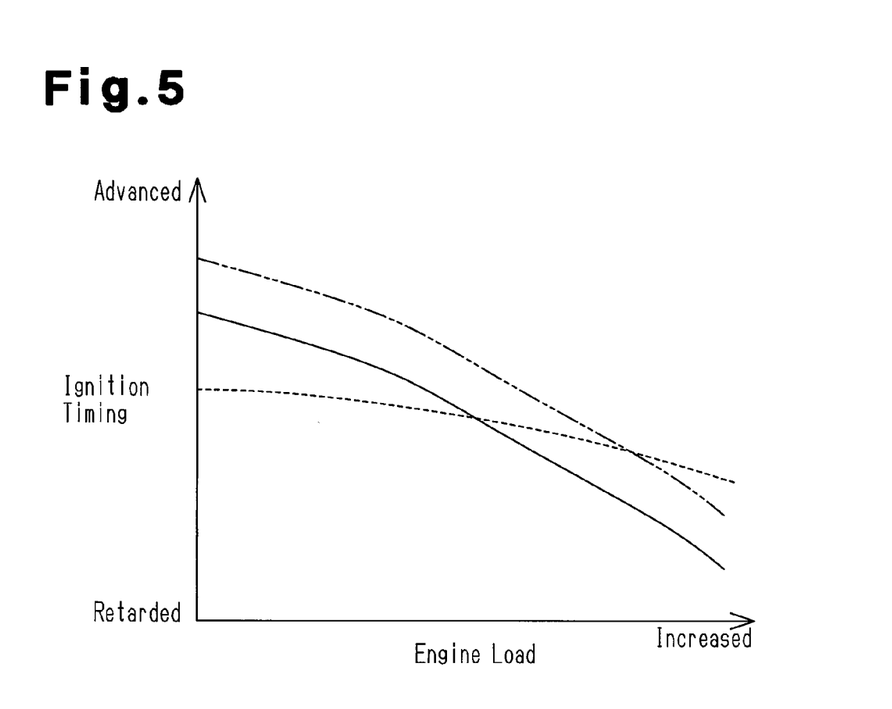
FIG. 5 is a graph representing the difference of the manner in which the knock limit ignition timing changes in relation to change of the engine load between when the fuel injection from the direct injector in the early stage of the intake stroke is performed and when such fuel injection is not performed.

[2] The fuel injection in the early stage of the intake stroke allows the injected fuel to adhere directly onto the top of the piston 13, thus cooling the top of the piston 13 through latent heat of vaporization generated by the fuel and suppressing the occurrence of knocking in the engine 1. FIG. 4 represents the relationship between the fuel injection amount in the fuel injection from the direct injector 7 in the early stage of the intake stroke and the ignition timing at the time when the ignition timing of the engine 1 is advanced maximally to such a limit that knocking does not occur (the knock limit ignition timing). The graph shows that, as the fuel injection amount in the early stage of the intake stroke becomes greater, the top of the piston 13 is cooled with more effectiveness, thus advancing the knock limit ignition timing. FIG. 5 represents the difference of the manner in which the knock limit ignition timing changes in relation to change of the engine load between when the fuel injection from the direct injector 7 in the early stage of the intake stroke is performed and when such fuel injection is not carried out. In the graph, the solid curve represents the knock limit ignition timing in the case with the fuel injection from the direct injector 7 in the early stage of the intake stroke and the double-dotted broken curve represents the knock limit ignition timing in the case without the aforementioned fuel injection. From comparison between these cases, it is clear that the fuel injection in the early stage of the intake stroke advances the knock limit ignition timing. When the engine 1 is in an operating range with comparatively high load, such advancement of the knock limit ignition timing allows the knock limit ignition timing to be a value close to the ignition timing that maximizes the output torque of the engine 1 (MBT). The ignition timing MBT is represented by the broken curve in FIG. 7.

Operation of the fuel injection control device of the first embodiment will hereafter be described.

To inject fuel from the direct injector 7 and the port injector 6 to supply the requested fuel injection amount Qfin of the engine 1, the fuel injection control device drives the direct injector 7 and the port injector 6 in the manner described below. First, the fuel injection control device sets target fuel injection amounts Qd2, Qd3 of the fuel injection from the direct injector 7 in the late stage of the intake stroke and the early stage of the intake stroke each to a requested value corresponding to the engine operating state. Specifically, of the target fuel injection amounts of fuel injection from the direct injector 7 in the late stage of the intake stroke and the early stage of the intake stroke, the target fuel injection amount of the fuel injection with a higher priority is set as a requested value corresponding to the engine operating state. Then, the target fuel injection amount of the fuel injection with the lower priority is set as a requested value corresponding to the engine operating state. The fuel injection control device then drives the direct injector 7 based on the set target fuel injection amounts Qd2, Qd3 such that the target fuel injection amounts Qd2, Qd3 are achieved in the respective fuel injection shots.

In this case, the target fuel injection amounts of the fuel injection from the direct injector 7 in the above-described shots are set based on the engine operating state to the values (the requested values) that maximize the advantages of the fuel injection in the respective shots, sequentially in the descending order according to the priority ranks given to the shots in the current engine operating state. The direct injector 7 is then operated to achieve the target fuel injection amounts of the respective shots of fuel injection. This achieves the advantages of the fuel injection in all shots of the fuel injection to a maximum extent to obtain maximum engine performance.

However, there may be a case in which the sum of the target fuel injection amounts Qd2, Qd3 of the fuel injection from the direct injector 7 in the late stage of the intake stroke and the early stage of the intake stroke falls short of the requested fuel injection amount Qfin. In this case, the fuel of the requested fuel injection amount Qfin cannot be fully injected by the fuel injection from the direct injector 7 in the late stage of the intake stroke and the early stage of the intake stroke. However, in this case, an amount of fuel that corresponds to a part of the requested fuel injection amount Qfin that cannot be injected by the fuel injection from the direct injector 7 in the respective shots is set as a target fuel injection amount Qp for fuel injection from the port injector 6. The port injector 6 is thus operated based on the set target fuel injection amount Qp to achieve the target fuel injection amount Qp.

The fuel injection from the direct injector 7 in the late stage of the intake stroke promotes air-fuel mixture formation by intensifying air streams in the cylinder. However, when the fuel injection amount increases beyond the target fuel injection amount Qd2, such fuel injection may adversely affect the fuel combustion. Further, the fuel injection from the direct injector 7 in the early stage of the intake stroke cools the top of the piston 13 using latent heat of vaporization produced by injected fuel to cool the temperature in the cylinder, thus suppressing the occurrence of knocking. However, if the fuel injection amount increases beyond the target fuel injection amount Qd3, such fuel injection may cause an excessive temperature drop in the cylinder, thus adversely affecting the fuel combustion.

To avoid these problems, an amount of fuel that corresponds to a part of the requested fuel injection amount Qfin that cannot be injected by the fuel injection from the direct injector 7 in the late stage of the intake stroke and the early stage of the intake stroke is injected by the fuel injection from the port injector 6. This makes it unlikely that the fuel injection amount of the fuel injection in the late stage of the intake stroke or the early stage of the intake stroke will increase beyond the corresponding target fuel injection amount to supply the requested fuel injection amount Qfin and thus adversely affect the fuel combustion. Also, since the fuel injection amount of the fuel injection in the late stage of the intake stroke becomes equal to the target fuel injection amount Qd2, the air streams in the cylinder are intensified through such fuel injection. Additionally, since the fuel injection amount of the fuel injection in the early stage of the intake stroke becomes equal to the target fuel injection amount Qd3, the top of the piston 13 is cooled appropriately such that the occurrence of knocking is suppressed through such cooling.

Figure 6:
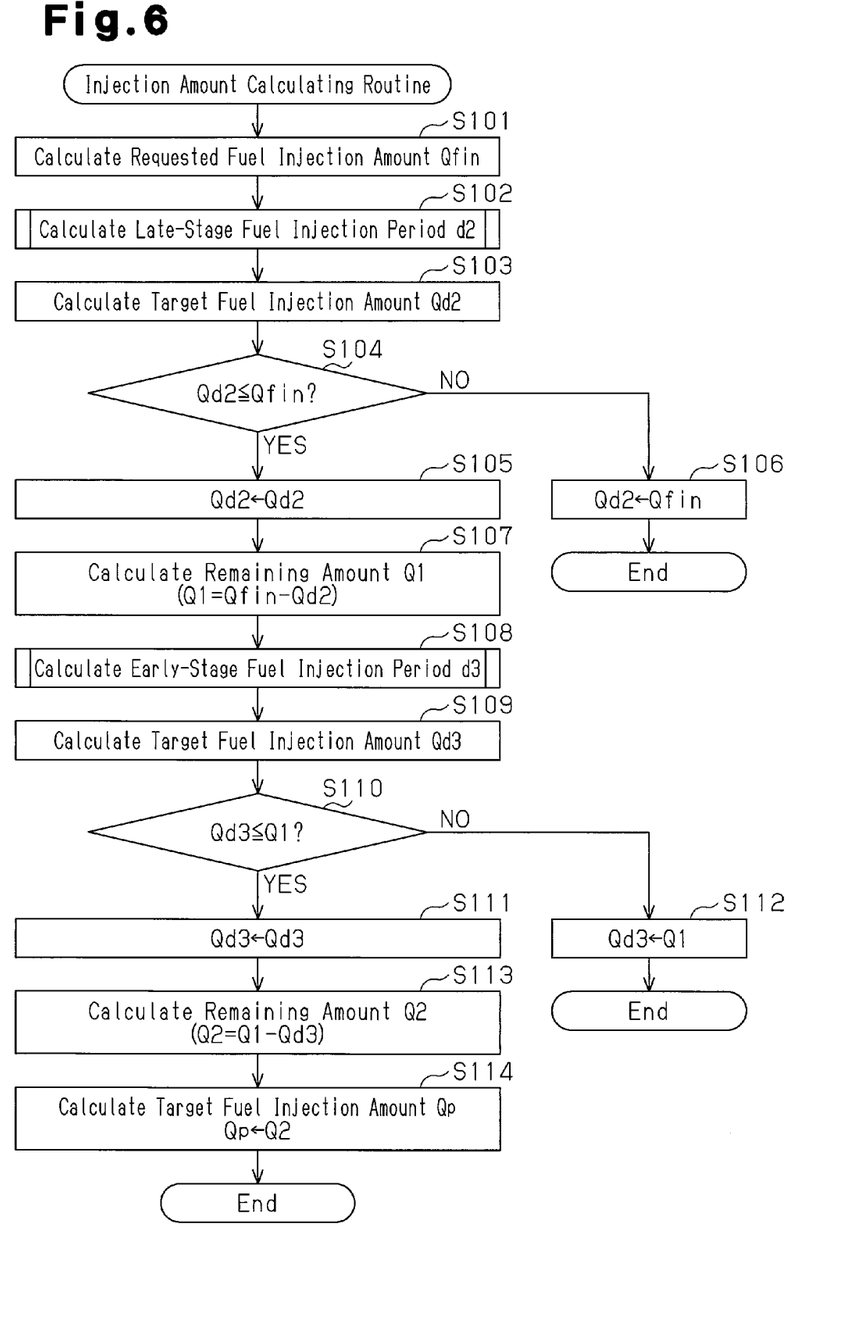
FIG. 6 is a flowchart representing a procedure for setting target fuel injection amounts for respective shots of the fuel injection from the direct cylinder and a target fuel injection amount for fuel injection from a port injector.

The target fuel injection amounts Qd2, Qd3 of the respective fuel injection shots of the direct injector 7 and the target fuel injection amount Qp of the fuel injection from the port injector 6 are calculated in the manner described below, as represented in the flowchart of FIG. 6 representing a fuel injection amount calculating routine. The fuel injection calculating routine is performed by the electronic control unit 16 in an interrupting manner every predetermined crank angle.

The routine is started by determining the requested fuel injection amount Qfin of the engine 1 based on the engine operating state such as the engine speed and the engine load (S101) and then the steps (A), (B) and (C) described below are carried out. (A) A procedure for setting the target fuel injection amount Qd2 of the fuel injection from the direct injector 7 in the late stage of the intake stroke (S102 to S106). (B) A procedure for setting the target fuel injection amount Qd3 of the fuel injection from the direct injector 7 in the early stage of the intake stroke (S107 to S112). (C) A procedure for setting the target fuel injection amount Qp of the fuel injection from the port injector 6 (S113, S114).

The procedures (A), (B), and (C) are performed sequentially in this order. When performing these procedures, the electronic control unit 16 functions as a setting section for setting the target fuel injection amounts Qd2, Qd3 and Qp. Specifically, in the shots of the fuel injection from the direct injector 7, a fuel injection shot closer to the ignition timing of the engine 1 has a greater influence on fuel ignition depending on variation of the fuel injection amount and is thus given higher priority. Accordingly, the procedures (A) and (B) regarding the fuel injection of the direct injector 7 are performed in the aforementioned order.

The procedures (A) to (C) will hereafter be described in detail.

The procedure (A) is started by calculating a late-stage fuel injection period d2, which is the period necessary for allowing the fuel injection amount of the direct injector 7 in the late stage of the intake stroke to become equal to the optimal value for the current engine operating state (the requested value), based on the engine operating state including the engine speed and the engine load and the direct injection pressure (S102). Then, the target fuel injection amount Qd2 is calculated by multiplying the late-stage fuel injection period d2 by the direct injection pressure (S103). Afterwards, it is determined whether the target fuel injection amount Qd2 is less than or equal to the requested fuel injection amount Qfin (S104). If a positive determination is made, the target fuel injection amount Qd2 determined in Step S103 is maintained (S105). In contrast, if the determination is negative, the target fuel injection amount Qd2 is replaced by the requested fuel injection amount Qfin (S106).

The procedure (B) is started by calculating a remaining amount Q1, which is the value obtained by subtracting the target fuel injection amount Qd2 set in the procedure (A) from the requested fuel injection amount Qfin (S107). Subsequently, an early-stage fuel injection period d3, which is the period necessary for allowing the fuel injection amount of the direct injector 7 in the early stage of the intake stroke to become equal to the optimal value for the current engine operating state (the requested value), is calculated (S108). Then, the target fuel injection amount Qd3 is calculated by multiplying the early-stage fuel injection period d3 by the direct injection pressure (S109). Afterwards, it is determined whether the target fuel injection amount Qd3 is less than or equal to the remaining amount Q1 (S110). If a positive determination is made, the target fuel injection amount Qd3 determined in Step S109 is maintained (S111). In contrast, if the determination is negative, the target fuel injection amount Qd3 is replaced by the remaining amount Q1 (S112).

In the procedure (C), a remaining amount Q2, which is the value determined by subtracting the target fuel injection amount Qd3 set in the procedure (B) from the remaining amount Q1, is calculated (S113). The remaining amount Q2 is then set as the target fuel injection amount Qp of the fuel injection from the port injector 6 (S114).

Figure 7:
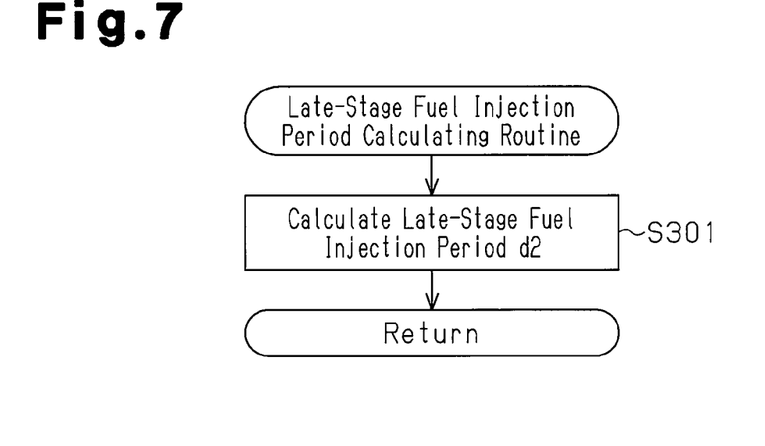
FIG. 7 is a flowchart representing a procedure for calculating a late-stage injection period.

Calculation of the late-stage fuel injection period d2 in Step S102 (FIG. 6) according to the injection amount calculating routine will hereafter be described in detail with reference to the flowchart of FIG. 7, which represents a late-stage fuel injection period calculating routine. The late-stage fuel injection period calculating routine is carried out by the electronic control unit 16 each time Step S102 is performed.

Figure 8:
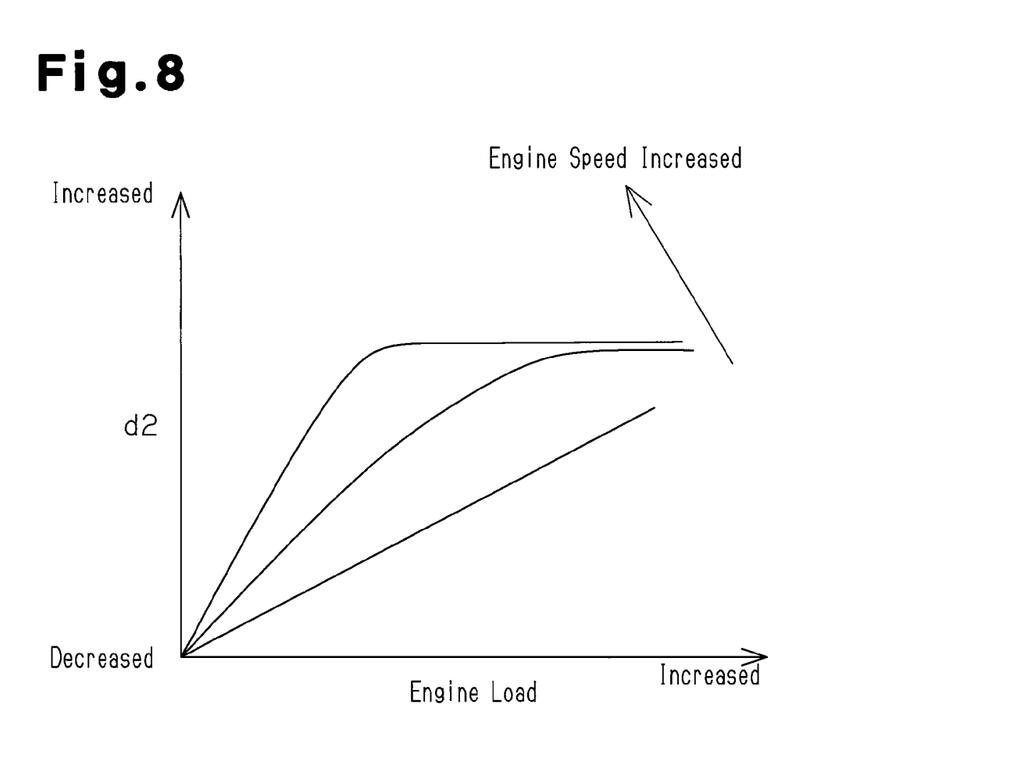
FIG. 8 is a graph representing the manner in which the late-stage injection period changes in relation to change of the engine speed and change of the engine load.

In the routine, the late-stage fuel injection period d2 is calculated based on the engine speed and the engine load with reference to a map (S301). The thus determined late-stage fuel injection period d2 is set to a greater value as the engine load becomes greater and the engine speed becomes higher, as represented in FIG. 8, for example, such that the injected fuel intensifies the air streams in the cylinder and the amount of the injected fuel is minimized. Also, the late-stage fuel injection period d2 is guarded not to increase beyond its maximum value.

Calculation of the early-stage fuel injection period d3 in Step S108 (FIG. 6) according to the injection amount calculating routine will hereafter be described in detail with reference to the flowchart of FIG. 9, which represents an early-stage fuel injection period calculating routine. The early-stage fuel injection period calculating routine is carried out by the electronic control unit 16 each time Step S108 is performed.

In this routine, the early-stage fuel injection period d3 is calculated based on MBT, a final ignition timing E, a final ignition timing I, and a maximum value α using the expression (1): $d3 = \alpha \cdot (MBT-E)/(I-E)$. In the expression (1), the MBT represents the ignition timing that maximizes the output torque of the engine 1. The final ignition timing E is the optimal ignition timing of the engine 1 in the case where the fuel injection from the direct injector 7 in the early stage of the intake stroke is not carried out. The final ignition timing I is the optimal ignition timing of the engine 1 for the case where the fuel injection in the fuel injection in the early stage of the intake stroke is carried out to a maximum extent to suppress the occurrence of knocking in the engine 1. The final ignition timings I, E change as the engine load changes as represented in, for example, FIG. 10(a). The maximum value α is the fuel injection period for the case where the fuel injection in the early stage of the intake stroke is carried out to a maximum extent.

In the process for calculating the early-stage fuel injection period d3 in the early-stage fuel injection period calculating routine (S401 to S407), the MBT is first is calculated based on the engine speed and the engine load (S401). Then, a basic ignition timing, which is a reference ignition timing of the engine 1 for the case where the fuel injection from the direct injector 7 in the early stage of the intake stroke is not performed, is calculated based on the engine operating state including the engine speed and the engine load (S402). The basic ignition timing is then subjected to different types of correction including correction based on whether knocking occurs in the engine 1 (KCS correction), correction based on the coolant temperature of the engine 1, and correction based on the valve timing of the intake valve 26 to obtain the final ignition timing E (S403). Also, another basic ignition timing, which is a reference ignition timing of the engine 1 for the case where the fuel injection from the direct injector 7 in the early stage of the intake stroke is carried out to a maximum extent to advance the knock limit of the engine 1, is calculated based on the engine operating state including the engine speed and the engine load (S404). The thus obtained basic ignition timing is subjected to different types of correction including the KCS correction, the correction based on the coolant temperature of the engine 1, and the correction based on the valve timing of the intake valve 26 to determine the final ignition timing I (S405). After the final ignition timing E and the final ignition timing I are obtained in the above-described manners, the maximum value $\alpha$ is calculated based on the engine operating state including the engine speed and the engine load (S406). Then, the early-stage fuel injection period d3 is calculated based on the MBT, the final ignition timing E, the final ignition timing I, and the maximum value $\alpha$, using the expression (1) (S407).

After the early-stage fuel injection period d3 is calculated in Step S407, the early-stage fuel injection period d3 is guarded not to exceed its maximum value. Then, it is determined whether the early-stage fuel injection period d3 is less than 0 (S408). If a positive determination is made, the early-stage fuel injection period d3 is set to 0 (S409). Specifically, in this case, when the final ignition timing E is advanced with respect to (greater than) the MBT in the low-load operating range of the engine 1 as represented in FIG. 10(a), the early-stage fuel injection period d3 calculated using the expression (1) is set to a value less than 0. In this case, the early-stage fuel injection period d3 is set to 0 through Steps S408 and S409.

An example of how the fuel injection of the engine 1 changes in relation to change of the engine load will now be described with reference to FIG. 10.

Figure 10A:
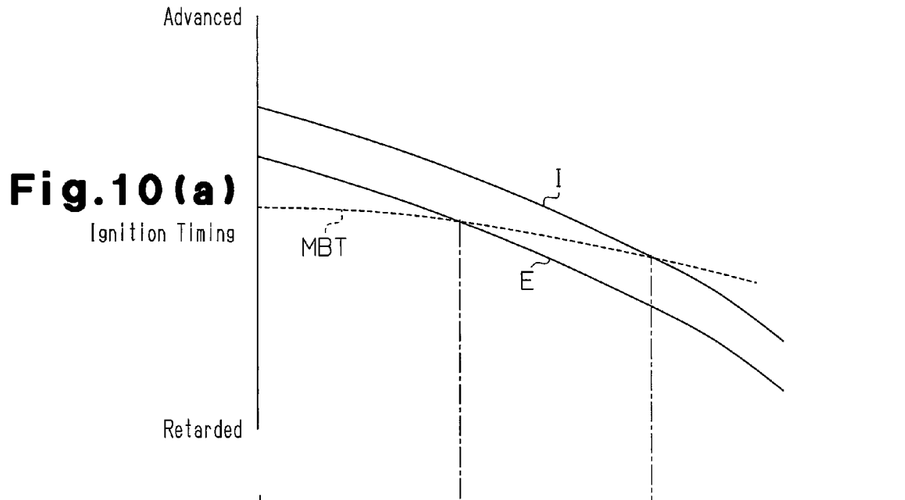
Figure 10B:
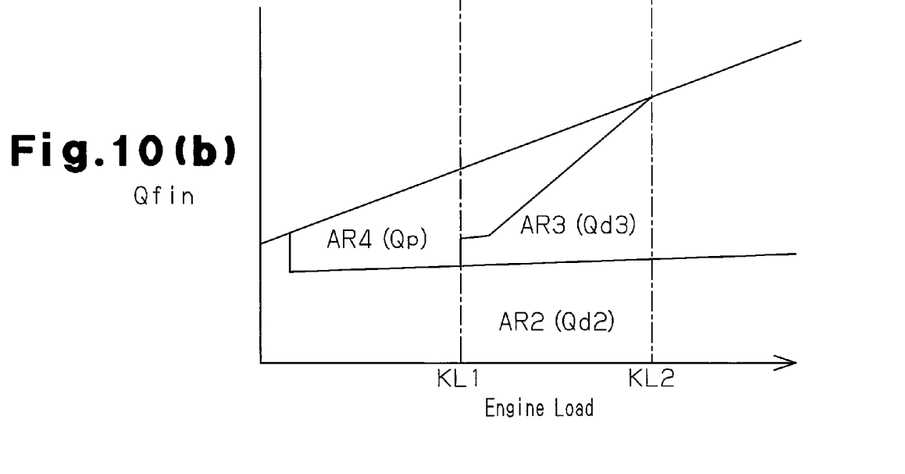

In FIG. 10(b), the fuel injection from the direct injector 7 in the late stage of the intake stroke is performed in the range AR2 and the fuel injection from the direct injector 7 in the early stage of the intake stroke is carried out in the range AR3. Further, the fuel injection from the port injector 6 is carried out in the range AR4. As is clear from FIG. 16(b), the range AR2 corresponds to the entire change range of the engine load. The range AR3 is in the range of the engine load greater than the predetermined value KL1, which is the load range in which the final ignition timing E is retarded with respect to (less than) the MBT.

When the engine load is the minimum, the fuel injection from the direct injector 7 in the late stage of the intake stroke by the target fuel injection amount Qd2 is performed to supply the requested fuel injection amount Qfin. Then, after the engine load increases with respect to the minimum value, the fuel injection from the direct injector 7 in the late stage of the intake stroke by the target fuel injection amount Qd2 and the fuel injection from the port injector 6 by the target fuel injection amount Qp are performed until the engine load reaches the predetermined value KL1, such that the requested fuel injection amount Qfin is achieved.

In the period from when the engine load exceeds the predetermined value KL1 to when the engine load reaches the predetermined value KL2, the fuel injection from the port injector 6 by the target fuel injection amount Qp is carried out while the fuel injection from the direct injector 7 in the late stage of the intake stroke by the target fuel injection amount Qd2 and the fuel injection from the direct injector 7 in the early stage of the intake stroke by the target fuel injection amount Qd3 are performed. In this manner, the requested fuel injection amount Qfin is achieved. Further, after the engine load exceeds the predetermined value KL2, the fuel injection from the direct injector 7 in the late stage of the intake stroke by the target fuel injection amount Qd2 and the fuel injection in the early stage of the intake stroke by the target fuel injection amount Qd3 are performed. As a result, the requested fuel injection amount Qfin is achieved.

As represented in FIG. 10(b), in this example, the target fuel injection amount Qd3 of the fuel injection from the direct injector 7 in the early stage of the intake stroke is set to a greater value as the engine load becomes greater. Accordingly, even though the increased engine load raises the temperature in the cylinder and may easily induce knocking, the target fuel injection amount Qd3 increases correspondingly to the increased engine load and thus allows the fuel injection in the early stage of the intake stroke by the target fuel injection amount Qd3 to cool the top of the piston 13 effectively. This suppresses the temperature rise in the cylinder and thus reduces the possibility of knocking, thus allowing advancement of the ignition timing of the engine 1 toward the MBT. The output torque of the engine 1 is thus increased through such ignition timing advancement.

Figure 11:
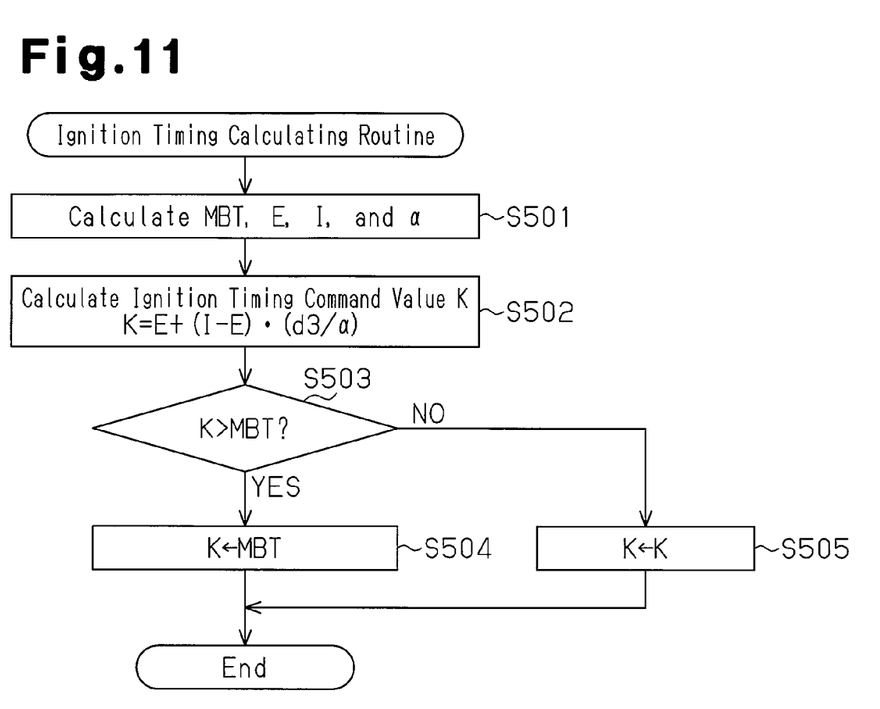
FIG. 11 is a flowchart representing a procedure for calculating an ignition timing command value.

Calculation of an ignition timing command value K, which is used in ignition timing control of the engine 1, will now be described with reference to the flowchart of FIG. 11, which represents an ignition timing calculating routine. The ignition timing calculating routine is carried out by the electronic control unit 16 in an interrupting manner every predetermined crank angle, for example.

Figure 9:
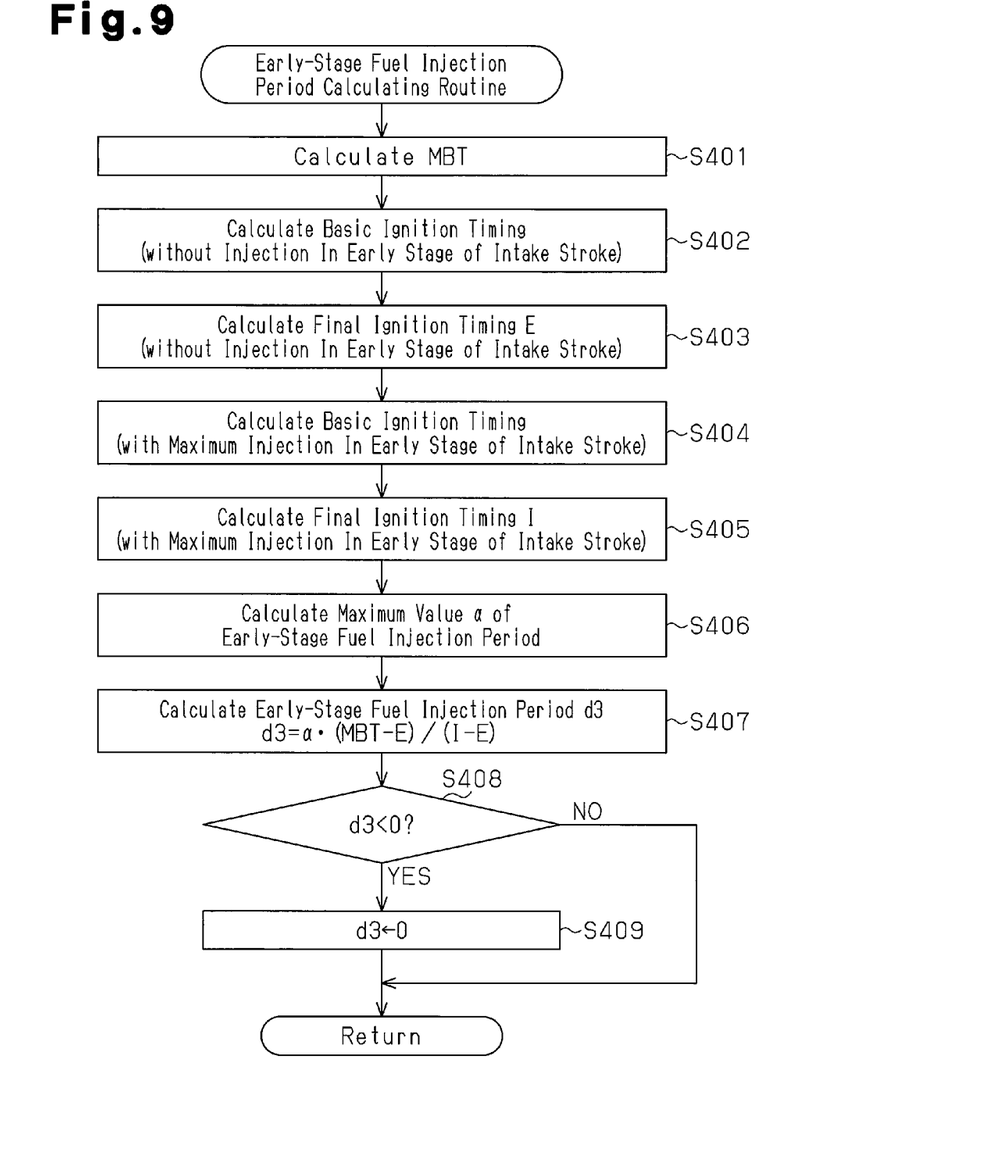
FIG. 9 is a flowchart representing a procedure for calculating the injection period.

In this routine, the MBT, the final ignition timing E, the final ignition timing I, and the maximum value $\alpha$ are calculated (S501), as in Steps S401, S403, S405, and S406 of the early-stage fuel injection period calculating routine (FIG. 9). Using the obtained final ignition timing E, final ignition timing I, and maximum value $\alpha$ and the early-stage fuel injection period d3 calculated in Step S407 of the early-stage fuel injection period calculating routine, the ignition timing command value K is calculated using the expression (3): $K=E+(I-E)\cdot(d3/\alpha)$ (S502). Then, it is determined whether the obtained ignition timing command value K is advanced with respect to (greater than) the MBT (S503). If a positive determination is made, the ignition timing command value K is replaced by the MBT (S504). If a negative determination is made, the ignition timing command value K is maintained (S505).

The above described embodiment has the following advantages.

(1) When the direct injector 7 and the port injector 6 inject fuel such that the requested fuel injection amount Qfin of the engine 1 is achieved, the direct injector 7 is operated in the manner described below. That is, of the target fuel injection amounts of fuel injection from the direct injector 7 in the late stage of an intake stroke and the early stage of the intake stroke, the target fuel injection amount of the fuel injection with a higher priority is set as a requested value corresponding to the engine operating state. Then, the target fuel injection amount of the fuel injection with the lower priority is set as a requested value corresponding to the engine operating state. The direct injector 7 is then operated to achieve the target fuel injection amounts in the respective fuel injection shots. In this case, the target fuel injection amounts of the fuel injection from the direct injector 7 in the above-described shots are set based on the engine operating state to the values (the requested values) that maximize the advantages of the fuel injection in the respective shots, sequentially in the descending order according to the priority ranks given to the shots in the current engine operating state. Accordingly, by operating the direct injector 7 to achieve the thus set target fuel injection amounts Qd2, Qd3 in the respective fuel injection shots, the advantages of the fuel injection shots are obtained altogether to a maximum extent and thus engine operation with its maximum performance is achieved. (2) When the sum of the target fuel injection amounts Qd2, Qd3 is short of the requested fuel injection amount Qfin, an amount of fuel that corresponds to the shortage is set as the target fuel injection amount Qp of the fuel injection from the port injector 6. The port injector 6 is then actuated based on the target fuel injection amount Qp to achieve the target fuel injection amount Qp. The port injector 6 thus injects an amount of fuel that corresponds to a part of the requested fuel injection amount Qfin that cannot be injected by the fuel injection in the late stage of the intake stroke and the early stage of the intake stroke. This makes it unlikely that the fuel injection amount of the fuel injection in the late stage of the intake stroke or the early stage of the intake stroke will increase beyond the corresponding target fuel injection amount to supply the requested fuel injection amount Qfin and thus adversely affect the fuel combustion. Also, since the fuel injection amount of the fuel injection in the late stage of the intake stroke becomes equal to the target fuel injection amount Qd2, the air streams in the cylinder are intensified through such fuel injection. Additionally, since the fuel injection amount of the fuel injection in the early stage of the intake stroke becomes equal to the target fuel injection amount Qd3, the top of the piston 13 is cooled appropriately such that the occurrence of knocking is suppressed through such cooling.

(3) The target fuel injection amount of the fuel injection from the direct injector 7 in the early stage of the intake stroke is set to a greater value as the engine load becomes greater. Accordingly, even though the increased engine load raises the temperature in the cylinder and may easily induce knocking, the target fuel injection amount Qd3 increases correspondingly to the increased engine load and thus allows the fuel injection in the early stage of the intake stroke by the target fuel injection amount Qd3 to cool the top of the piston 13 effectively. This suppresses the temperature rise in the cylinder and thus reduces the possibility of knocking, thus allowing advancement of the ignition timing of the engine 1 toward the MET. The output torque of the engine 1 is thus increased through such ignition timing advancement.

The above described embodiment may be modified as follows.

The priority ranks given to the fuel injection shots of the direct injector 7 may be modified as needed in correspondence with, for example, the operating state of the engine 1.

The present invention may be used in an internal combustion engine without a port injector 6. In this case, of the settings of the fuel injections from the direct injector 7, that is, of the settings of the target fuel injection amounts Qd2, Qd3 in the fuel injection in the late stage and the early stage of the intake stroke, the setting of the target fuel injection amount Qd3 in the fuel injection in the early stage is performed after completion of the setting of the target fuel injection amount Qd2 of the fuel injection in the late stage. In this modification, if the sum of the target fuel injection amounts Qd2, Qd3 is short of the requested fuel injection amount Qfin, it is preferable an amount of fuel that corresponds to the shortage be injected by the direct injector 7 through the fuel injection in the early stage of the intake stroke. As a result, an amount of fuel that corresponds to a part of the requested fuel injection amount Qfin that cannot be injected by the fuel injection from the direct injector 7 in the late stage of the intake stroke is injected by the fuel injection from the direct injector 7 in the early stage of the intake stroke.

Such fuel injection from the direct injector 7 makes it unlikely that the fuel injection amount of the fuel injection in the late stage of the intake stroke will increase beyond the target fuel injection amount Qd2 to supply the requested fuel injection amount Qfin and thus adversely affect the fuel combustion. Also, since the fuel injection amount of the fuel injection in the late stage of the intake stroke becomes equal to the target fuel injection amount Qd2, the air streams in the cylinder are intensified through such fuel injection.

The fuel injection from the direct injector 7 of this modification may be employed in the engine 1 including the direct injector 7 and the port injector 6, as in the case of the above illustrated embodiment.

DESCRIPTION OF THE REFERENCE NUMERALS

1 . . . internal combustion engine, 2 . . . intake passage, 2a . . . intake port, 3 . . . combustion chamber, 4 . . . throttle valve, 5 . . . accelerator pedal, 6 . . . port injector, 7 . . . direct injector, 8 . . . fuel tank, 9 . . . feed pump, 10 . . . high-pressure fuel pump, 12 . . . spark plug, 13 . . . piston, 14 . . . crankshaft, 15 . . . exhaust passage, 16 . . . electronic control unit, 17 . . . accelerator position sensor, 18 . . . throttle position sensor, 19 . . . air flow meter, 20 . . . crank position sensor, 21 . . . cam position sensor, 22 . . . coolant temperature sensor, 23 . . . first pressure sensor, 24 . . . second pressure sensor, 25 . . . intake camshaft, 26 . . . intake valve, 27 . . . exhaust camshaft, 28 . . . exhaust valve, 29 . . . variable valve timing mechanism, 30 . . . knock sensor, 31 . . . low-pressure fuel pipe, 32 . . . pressure regulator, 33 . . . high-pressure fuel pipe

The invention claimed is:

1. A fuel injection control device for an internal combustion engine having a direct injector capable of injecting fuel into a cylinder of the engine in a late stage of an intake stroke and an early stage of the intake stroke of the engine, the fuel injection control device performing fuel injection from the direct injector to supply a requested fuel injection amount determined based on an engine operating state, the control device comprising:

an electronic control unit that is programmed to
set a target fuel injection amount of the fuel injection from the direct injector in the late stage of the intake stroke to a requested value corresponding to the engine operating state,
when the requested fuel injection amount is less than or equal to the target fuel injection amount, operate the direct injector to inject the requested fuel injection amount of fuel in the late stage of the intake stroke, and
when the requested fuel injection amount is greater than the target fuel injection amount, operate the direct injector to inject the target fuel injection amount of fuel in the late stage of the intake stroke, and operate the direct injector to inject, in the early stage of the same intake stroke, an amount of fuel that is obtained by subtracting the target fuel injection amount from the requested fuel injection amount.

2. A fuel injection control device for an internal combustion engine having a direct injector capable of injecting fuel into a cylinder of the engine in a late stage of an intake stroke and an early stage of the intake stroke of the engine and a port injector capable of injecting fuel into an intake port of the engine, the fuel injection control device performing fuel injection from the direct injector and the port injector to supply a requested fuel injection amount determined based on an engine operating state, the control device comprising:

an electronic control unit that is programmed to
set first and second target fuel injection amounts of fuel injection from the direct injector in the late stage of the intake stroke and the early stage of the same intake stroke to requested values corresponding to the engine operating state, respectively, when the requested fuel injection amount is less than or equal to the first target fuel injection amount, operate the direct injector to inject the requested fuel injection amount of fuel in the late stage of the intake stroke, when the requested fuel injection amount is greater than the first target fuel injection amount and is less than or equal to the total value of the first and second target fuel injection amounts, operate the direct injector to inject the first target fuel injection amount of fuel in the late stage of the intake stroke, and operates the direct injector to inject, in the early stage of the same intake stroke, an amount of fuel that is obtained by subtracting the first target fuel injection amount from the requested fuel injection amount, and when the requested fuel injection amount is greater than the total value of the first and second target fuel injection amounts, operate the direct injector to inject, in the late stage of the intake stroke and the early stage of the same intake stroke, the first target fuel injection amount of fuel and the second target fuel injection amount of fuel, respectively, and operate the port injector to inject an amount of fuel that is obtained by subtracting the total value of the first and second target fuel injection amounts from the requested fuel injection amount.

3. The fuel control device according to claim 2, wherein the electronic control unit is programmed to increase the second target fuel injection amount as the engine load increases.

* * * * *